(12) United States Patent
Suda et al.

(10) Patent No.: US 12,737,604 B2
(45) Date of Patent: Sep. 15, 2026

(54) ANALOGUE CIRCUIT FOR ACTIVATION FUNCTION COMPUTATION IN NEUROMORPHIC SYSTEMS

(71) Applicant: TDK CORPORATION, Tokyo (JP)

(72) Inventors: Keita Suda, Tokyo (JP); Yukihiro Urakawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 742 days.

(21) Appl. No.: 18/190,264

(22) Filed: Mar. 27, 2023

(65) Prior Publication Data

US 2024/0330668 A1 Oct. 3, 2024

(51) Int. Cl.
*G06N 3/065* (2023.01)
*G06N 3/048* (2023.01)

(52) U.S. Cl.
CPC ............. *G06N 3/065* (2023.01); *G06N 3/048* (2023.01)

(58) Field of Classification Search
CPC ............................... G06N 3/065; G06N 3/048
See application file for complete search history.

(56) References Cited

U.S. PATENT DOCUMENTS

| | | | | |
|---|---|---|---|---|
| 6,670,903 | B2 * | 12/2003 | Fujita | H04N 25/00 348/E3.018 |
| 2003/0168335 | A1 * | 9/2003 | Rankin | G01N 27/3273 204/406 |
| 2004/0232950 | A1 * | 11/2004 | Mallinson | H03F 3/45183 327/103 |
| 2020/0167402 | A1 * | 5/2020 | Newns | G06N 3/08 |
| 2023/0055056 | A1 | 2/2023 | Suzuki | |

FOREIGN PATENT DOCUMENTS

| | | |
|---|---|---|
| JP | 2020-087189 A | 6/2020 |
| WO | 2021/192069 A1 | 9/2021 |

OTHER PUBLICATIONS

Vatalaro M, Moposita T, Strangio S, Trojman L, Vladimirescu A, Lanuzza M, Crupi F. A low-voltage, low-power reconfigurable current-mode softmax circuit for analog neural networks. Electronics. Apr. 22, 2021; 10(9):1004 pp. 1-11. (Year: 2021).*

Anson M, Bayley P. Versatile precision source ratioing system for fast kinetic spectroscopy. Review of Scientific Instruments. Mar. 1, 1976; 47(3): pp. 370-373. (Year: 1976).*

"Implementation of activation function elements for all-optical neural network circuits", Demonstration using low-power semiconductor thin-film laser on silicon substrate, Tokyo Institute of Technology, Dec. 2, 2022, https://www.titech.ac.jp/news/2022/065429.

* cited by examiner

*Primary Examiner* — KC Chen
(74) *Attorney, Agent, or Firm* — Oliff PLC

(57) ABSTRACT

An analogue arithmetic unit according to an embodiment includes a plurality of input terminals, a voltage/current conversion circuit, a current addition circuit, a current/voltage conversion circuit, and a division circuit. The voltage/current conversion circuit exponentially converts each input voltage applied to each of the plurality of input terminals and outputs the converted input voltage as a current. The current addition circuit obtains a sum of the currents converted by the voltage/current conversion circuit. The current/voltage conversion circuit converts each of the currents and the sum of the currents into voltages. The division circuit calculates a ratio of the voltage obtained by converting each of the currents to a total voltage obtained by converting the sum of the currents.

9 Claims, 9 Drawing Sheets

$e^{x_1}$ $e^{x_2}$ ... $e^{x_i}$ ... $e^{x_n}$ $\sum e^{x_i}$ $y_1$ $y_2$ ... $y_i$ ... $y_n$ t=2n+1

ANALOGUE CIRCUIT FOR ACTIVATION FUNCTION COMPUTATION IN NEUROMORPHIC SYSTEMS

BACKGROUND

Field

The present invention relates to an analogue arithmetic unit and a nuromorphic device.

Description of Related Art

In recent years, edge computing in which data is processed in a distribution manner has attracted attention. Edge computing is a concept opposite to that of cloud computing in which data is centrally processed in a cloud. Edge computing has characteristics in which large-scale servers like in cloud computing are not required, a network load can be reduced, and security enhancement is facilitated.

On the other hand, implementing large-scale arithmetic units in edge terminals used for edge computing is difficult and reducing an arithmetic operation load in edge terminals is required.

Arithmetic operations of neural networks using software have a high arithmetic operation load. Arithmetic operations of software are generally performed in digital arithmetic units of general-purpose devices such as CPUs and GPUs. If the arithmetic operation load of digital arithmetic units is high, the arithmetic operations have long processing times and the power consumption of devices increases. Thus, devices specialized for neural networks have been proposed. For example, Patent Document 1 discloses a reservoir element in which an arithmetic operation of reservoir computing that is one of processes of a neural network is changed to an analogue process in a physical device.

Patent Documents

[Patent Document 1] PCT International Publication No. WO2021/192069

SUMMARY

In a neural network, at the time of outputting an input to the next neuron, the result of the sum-of-product arithmetic operation is substituted into an activation function and non-linearly transformed. If the processing of the activation function is subjected to an arithmetic operation using a digital arithmetic unit, there, are many processing steps and the arithmetic operation takes a long time. Furthermore, if an arithmetic operation load is high, the power consumption of a device increases.

The present disclosure was made in view of the above circumstances and provides an analogue arithmetic unit which converts an arithmetic operation of an activation function into an analogue process in a physical device.

An analogue arithmetic unit according to an embodiment includes a plurality of input terminals, a voltage/current conversion circuit, a current addition circuit, a current/voltage conversion circuit, and a division circuit. The voltage/current conversion circuit exponentially converts each input voltage applied to each of the plurality of input terminals and outputs the converted input voltage as a current. The current addition circuit obtains a sum of the currents converted by the voltage/current conversion circuit. The current/voltage conversion circuit converts each of the currents and the sum of the currents into voltages. The division circuit calculates a ratio of the voltage obtained by converting each of the currents to a total voltage obtained by converting the sum of the currents.

The analogue arithmetic unit according to the aspect can perform analogue processing of an arithmetic operation of an activation function using a physical circuit or the like.

BRIEF DESCRIPTION OF THE DRAWINGS

FIG. 2 is a conceptual diagram of a second example of the neural network simulated by the nuromorphic device according to the first embodiment.

FIG. 5 is an image diagram of arithmetic operation processing when all arithmetic operations of a softmax function are performed using a digital arithmetic unit.

FIG. 6 is a pattern diagram of an analogue arithmetic unit according to a second embodiment.

DETAILED DESCRIPTION

Figure 1:
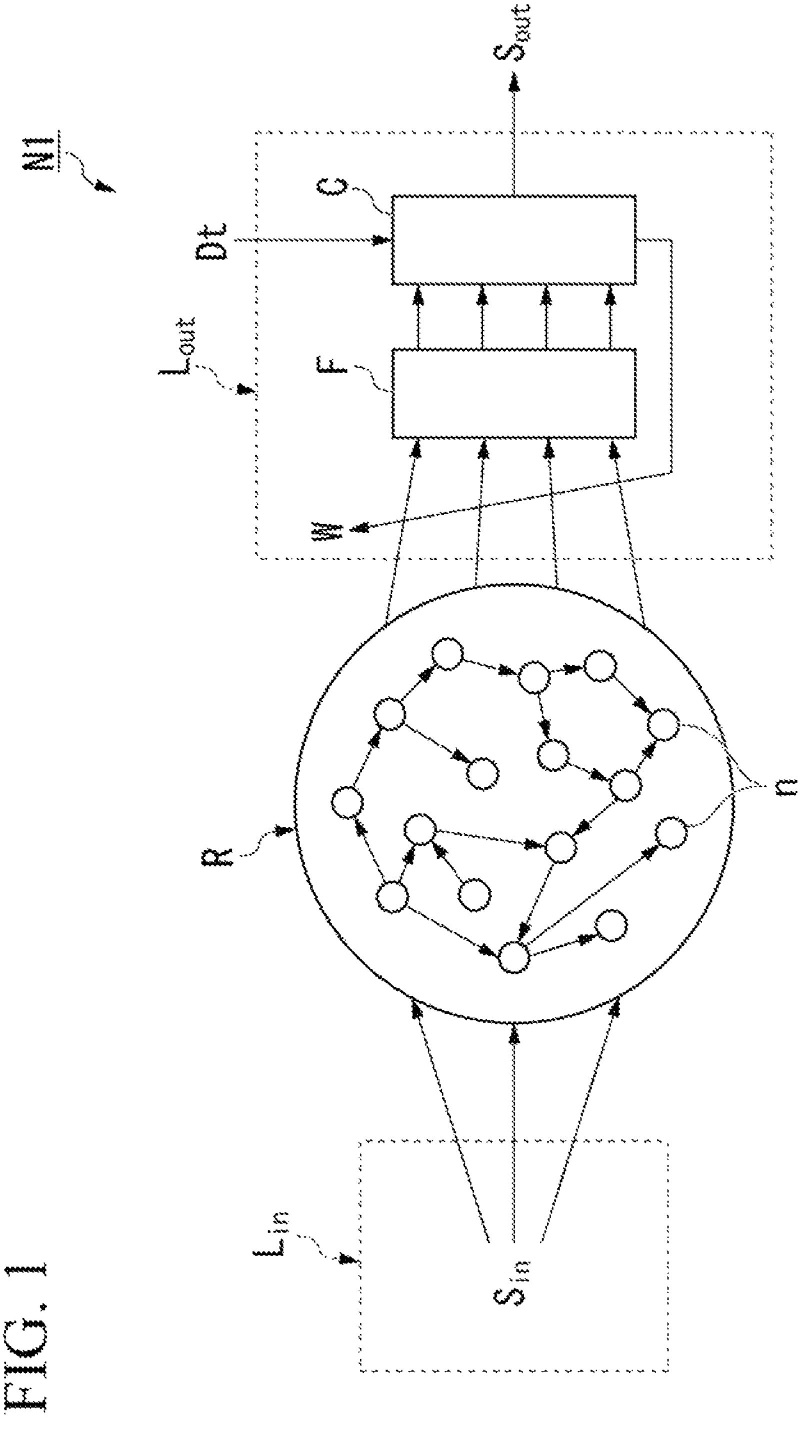
FIG. 1 is a conceptual diagram of a first example of a neural network simulated by a nuromorphic device according to a first embodiment.

Embodiments will be described in detail below with reference to the drawings as appropriate. In the drawings used in the following explanation, the characteristic parts may be enlarged for convenience to make it easier to understand the characteristics of the present invention in some cases and dimensional ratios of each constituent element may differ from the actual ones in some cases. The materials, the dimensions, and the like exemplified in the following explanation are examples and the present invention is not limited to them. In addition, the embodiments can be implemented by appropriately modifying the materials, the dimensions, and the like exemplified in the following explanation within the range in which the effects of the present invention are exhibited.

First Embodiment

FIG. 1 is a conceptual diagram of a neural network simulated by a nuromorphic device according to a first embodiment. A neural network N1 illustrated in FIG. 1 is a conceptual pattern diagram of reservoir computing. The neural network N1 illustrated in FIG. 1 has an input layer $L_{in}$, a reservoir layer R. and an output layer $L_{out}$. The input layer $L_{in}$ and the output layer $L_{out}$ are connected to the reservoir layer R.

An input signal $S_{in}$ is input from the input layer $L_{in}$ to the reservoir layer R. The input layer $L_{in}$ may be omitted. That is to say, the input signal $S_{in}$ may be input to the reservoir layer R as it is. Furthermore, the input signal $S_{in}$ may be weighted and then input to the reservoir layer R.

The reservoir layer R stores the input signal $S_{in}$ input from the input layer $L_{in}$ and converts the input signal $S_{in}$ into another signal. The reservoir layer R has a plurality of nodes n. In the reservoir layer R, coupling weights between the nodes n are set using, for example, random numbers. Furthermore, a coupling coefficient indicating each of the coupling weights between the nodes n may be set, for example, so that an mutual information between an output signal and a signal to be expected is maximized. An output of each of the nodes n propagates to another node among the nodes n via the activation function and the input signal $S_{in}$ changes non-linearly in the reservoir layer R.

Input signals $S_{in}$ interact with each other in the reservoir layer R and change over time. The nodes n correspond to a neuron of a neural circuit and a connection between the nodes n corresponds to a synapse. The plurality of nodes n are randomly connected. For example, a signal output from one of the nodes n at time t may return to a node of the nodes n from which a signal is output at time t+1 in some cases. Processing based on the signals at time t and time t+1 is performed in the nodes n and information is processed recursively.

The output layer $L_{out}$ receives an input of a signal from the reservoir layer R and outputs an output signal $S_{out}$ based on the signal.

The output layer $L_{out}$ has, for example, an activation function F and a comparator C. The activation function F non-linearly converts a signal from the reservoir layer R. For example, a softmax function and a sigmoid function are examples of the activation function F.

The softmax function is a function of converting a plurality of input values, normalizing the input values so that a sum of a plurality of output values is "1.0," and outputting an activation rate corresponding to each of the input values.

The softmax, function performs an arithmetic operation of the following Expression (1), $x_i$ in Expression (1) is an input to the softmax function and $y_i$ is an output from the softmax function.

[Math. 1]

$$y_i = \frac{e^{x_i}}{\sum_{k=1}^{n} e^{x_k}} \quad (i = 1, 2, \cdots, n) \tag{1}$$

The sigmoid function is a function of modeling the properties of nerve cells in living organisms.

The sigmoid function performs an arithmetic operation of the following Expression (2), x in Expression (2) is an input to the sigmoid function and f(x) is an output from the sigmoid function.

[Math. 2]

$$f(x) = \frac{1}{1+\exp(-x)} = \frac{\exp(x)}{\exp(x)+\exp(0)} \tag{2}$$

The comparator C compares the output from the activation function F with teacher data Dt. The teacher data Dt is, for example, a teacher label in a multi-class classification problem. The comparator C includes, for example, a processor.

Learning processing and inference processing are performed in the output layer $L_{out}$. In the output layer $L_{out}$, at the time of learning processing, a cross entropy error between the output from the activation function F and the teacher data Dt is obtained and a coupling weight w between the node n of the reservoir layer R and the output layer $L_{out}$ is adjusted. Learning may be batch learning or online learning.

An inference result based on the input signal $S_{in}$ and the coupling weight w is output as the output signal $S_{out}$, from the output layer $L_{out}$ at the time of inference processing.

Although reservoir computing is illustrated herein as an example of the neural network N1, the present invention is not limited to this example.

Figure 2:
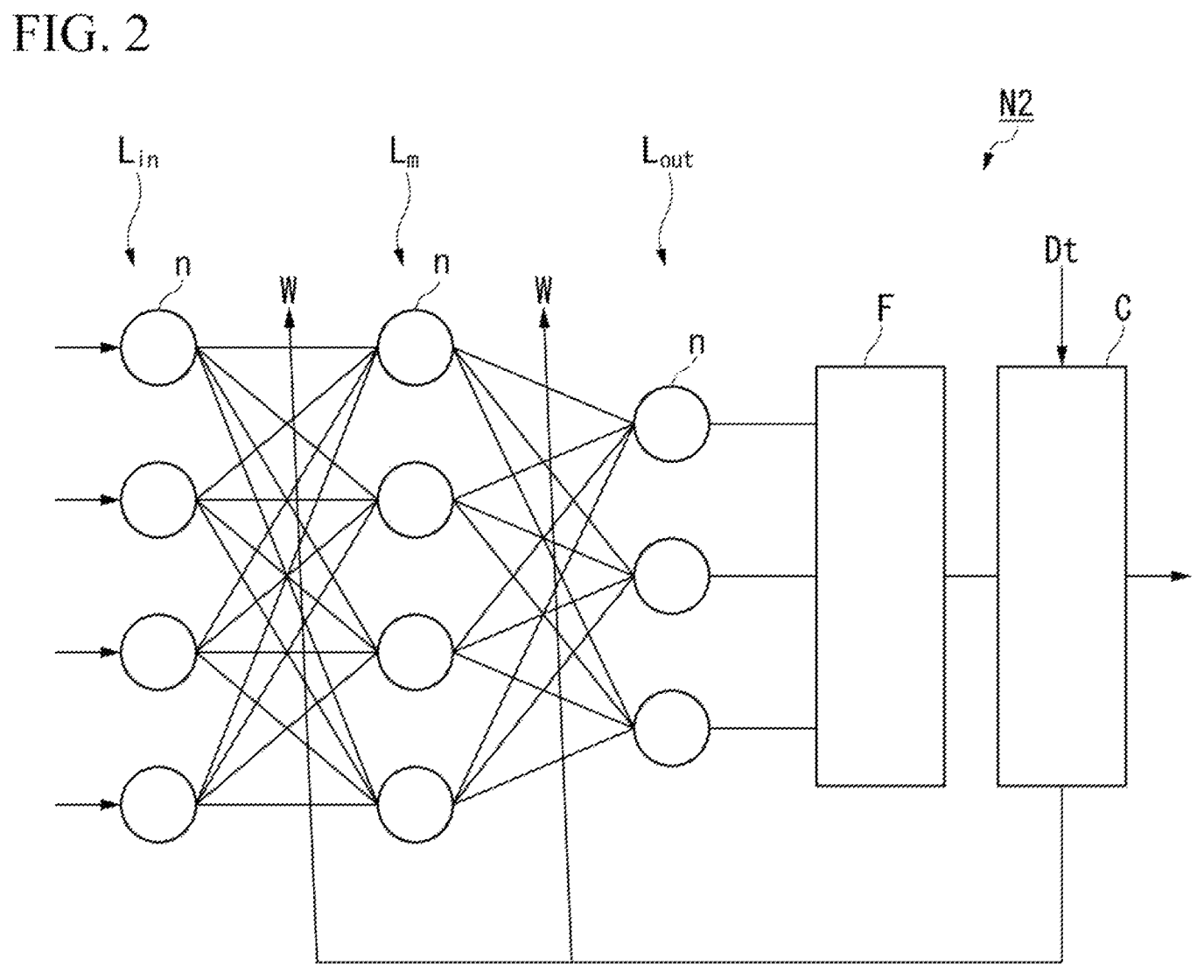

For example, FIG. 2 is a second example of a conceptual diagram of a neural network N2 simulated by the nuromorphic device according to the first embodiment. The neural network N2 illustrated in FIG. 2 is a forward-propagation type neural network in which nodes are formed in a hierarchical form.

The neural network N2 illustrated in FIG. 2 has, for example, an input layer $L_{in}$, an intermediate layer $L_{in}$, and an output layer $L_{out}$. Each of the input layer $L_{in}$, the intermediate layer $L_{in}$, and the output layer $L_{out}$ has a plurality of nodes n. The intermediate layer $L_{out}$, may have two layers or more.

The coupling weight w is set between the node n of the input layer $L_{in}$, and the node n of the intermediate layer $L_{in}$ and between the node n of the intermediate layer $L_{in}$ and the node n of the output layer $L_{out}$. The coupling weight w is adjusted on the basis of the result obtained by comparing the output from the output layer $L_{out}$ with the teacher data Dt using the comparator C. The coupling weight w is determined at the time of learning processing.

Figure 3:
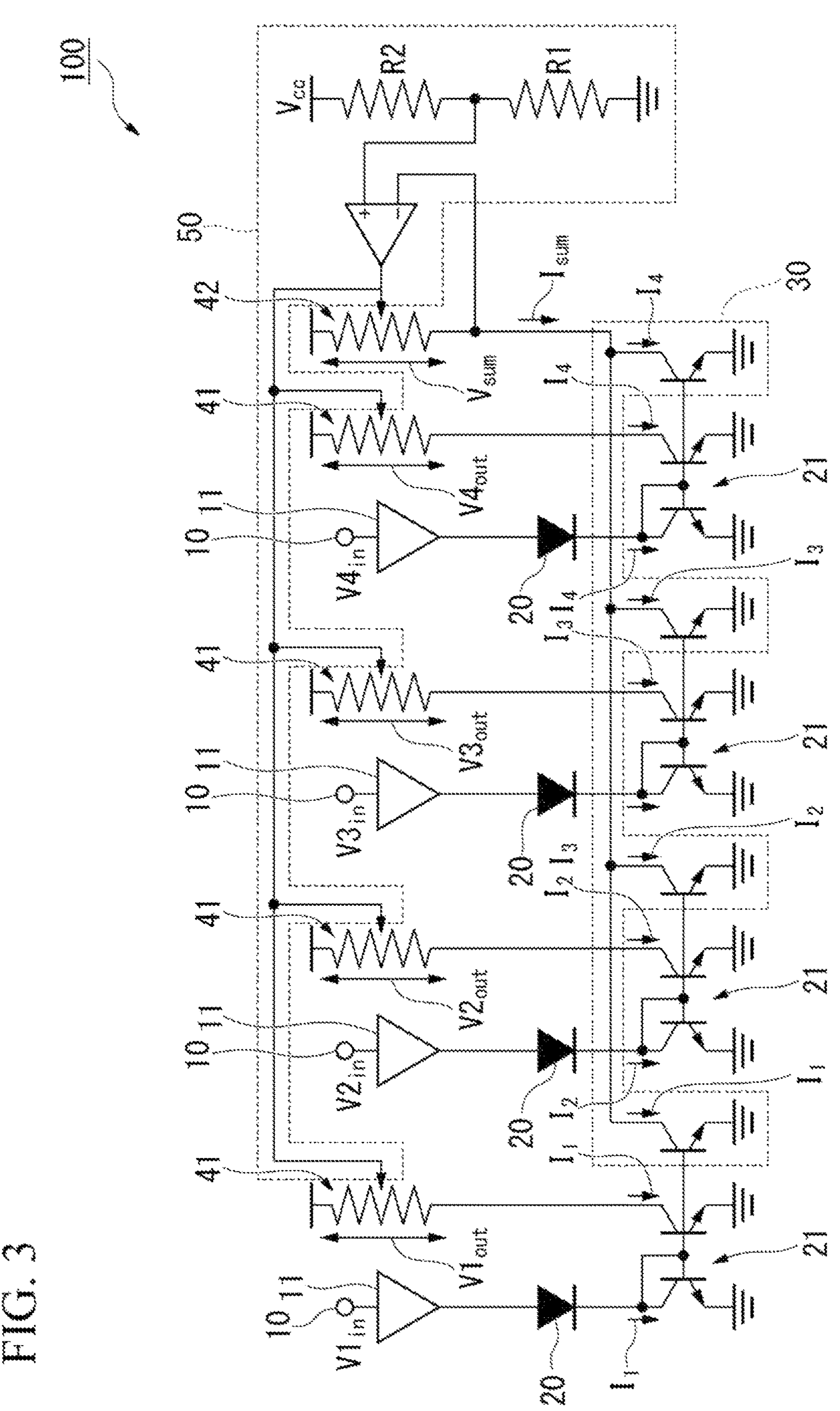
FIG. 3 is a pattern diagram of an analogue arithmetic unit according to the first embodiment.

FIG. 3 is a pattern diagram of an analogue arithmetic unit 100 according to the first embodiment. The analogue arithmetic unit 100 is obtained by realizing processing of the activation function using a circuit in which a physical device is used. The analogue arithmetic unit 100, for example, simulates the processing of the softmax function of the activation function and can be replaced by an arithmetic operation processing part which performs an arithmetic operation of the softmax function of FIGS. 1 and 2.

The analogue arithmetic unit 100 includes a plurality of input terminals 10, voltage/current conversion circuits 20, a current addition circuit 30, current/voltage conversion circuits 41 and 42, and a division circuit 50.

Input voltages are applied to the input terminals 10. Here, the input voltages are differences between input potentials and a ground potential. In the case of the neural network N1 of FIG. 1, each of the input voltages corresponds to a signal obtained by multiplying the output from the reservoir layer R by the coupling weight w. In the case of the neural network N2 of FIG. 2, the input voltage corresponds to the output signal from the output layer $L_{out}$. Although FIG. 3 illustrates an example in which the four input terminals 10 are provided, the number of input terminals 10 may not be limited to four.

Figure 4:
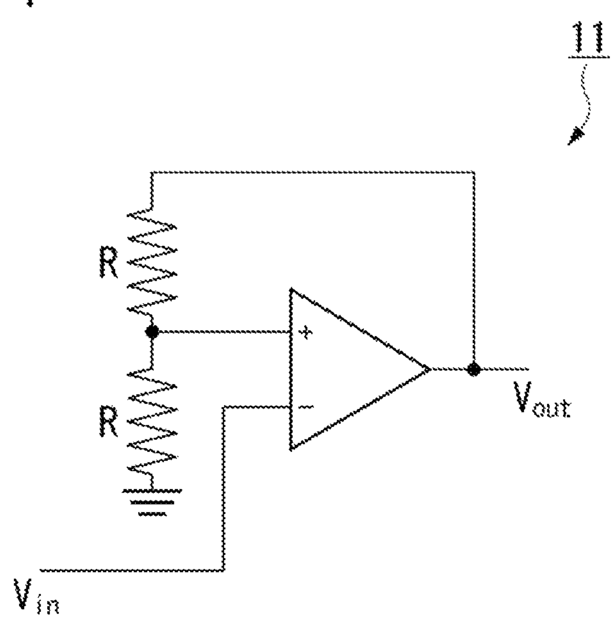
FIG. 4 is a pattern diagram of a voltage amplifier circuit according to the first embodiment.

The input terminals 10 are connected to, for example, voltage amplifier circuits 11. FIG. 4 is an example of a circuit diagram of each of the voltage amplifier circuits 11. The voltage amplifier circuit 11 illustrated in FIG. 4 doubles an input voltage $V_{in}$ and outputs an output voltage $V_{out}$. The input voltage $V_{in}$ and the output voltage $V_{out}$ satisfy a relationship of $V_{out}=2V_{in}$.

A part of the output voltage $V_{out}$ output from each of the voltage amplifier circuits 11 is divided and applied to each of the voltage/current conversion circuits 20. A voltage having a size that is the same as that of the input voltage $V_{in}$ can be applied to the voltage/current conversion circuit 20 by doubling the input voltage $V_{in}$ using the voltage amplifier circuit 11.

The voltage/current conversion circuit 20 includes, for example, an exponential conversion element. The exponential conversion element outputs a current which changes exponentially with respect to the input voltage. One or more voltage/current conversion circuits 20 may be provided. The number of voltage/current conversion circuits 20 may be, for example, the same as the number of input terminals 10. For example, each of the plurality of voltage/current conversion circuits 20 is connected to one of the input terminals 10. The voltage/current conversion circuit 20 exponentially converts the input voltage applied to each of the plurality of input terminals and outputs the converted input voltage as a current.

The exponential conversion element is, for example, a diode. The diode is, for example, a diode in which a p-n junction of a diffusion layer is used. The diode is formed, for example, on a semiconductor substrate such as Si.

The following Expression (3) illustrates the current/voltage characteristics of the diode. $I_S$ in Expression (3) is a leakage current, V is a voltage applied to the diode, 1 is a current output from the diode, and $V_T$ is expressed by kT/e, T is a temperature, k is the Boltzmann constant, e is an electron charge amount, and m is an emission coefficient. The emission coefficient is 1 or 2, and in the case of a diode formed in a Si semiconductor type, m=1 may be satisfied in many cases. At room temperature (T=300 K), $V_T$=26 mV is satisfied. V applied to the diode is much larger than $V_T$ and can be approximated using $I=I_S(\exp(V/mV_T)$.

[Math. 3]

$$I = I_s\left(\exp\left(\frac{V}{\mathrm{m}V_T}\right) - 1\right) \quad (3)$$

As illustrated in Expression (3), the diode is a non-linear conversion element configured to output a current which changes exponentially with respect to an input voltage. The non-linear conversion in the diode corresponds to the processing of converting an input signal $x_i$ into $e^{xi}$ in the softmax function.

Each current replication circuit 21 is connected to each of the voltage/current conversion circuits 20. The current replication circuit 21 replicates a current output from the voltage/current conversion circuit 20. The current replication circuit 21 outputs a current having a magnitude that is equal to that of the current output from the voltage/current conversion circuit 20 to a line parallel to a line to which the voltage/current conversion circuit 20 is connected. The current replication circuit 21 includes, for example, a bipolar transistor and a field effect transistor, The current addition circuit 30 obtains a sum of currents converted by the voltage/current conversion circuits 20, The current addition circuit 30 is, for example, connected to each of the plurality of current replication circuits 21. The addition of the currents is performed by bundling (combining) the currents replicated by the plurality of current replication circuits 21 using the current addition circuit 30. The current addition circuit 30 has a function of adding each of the plurality of currents by combining the currents.

Each of the current/voltage conversion circuits 41 converts each of the currents converted by the voltage/current conversion circuit 20 into a voltage. The current/voltage conversion circuit 42 convers a sum of the currents converted by the voltage/current conversion circuits 20 into a voltage. The voltage occurs between terminals of each of the current/voltage conversion circuits 41 and each of the voltage/current conversion circuits 20.

For example, the plurality of current/voltage conversion circuits 41 may be provided. The number of current/voltage conversion circuits 41 may be, for example, the same as the number of input terminals 10. Each of the current/voltage conversion circuits 41 is connected to, for example, any one of the current replication circuits 21. The current/voltage conversion circuit 42 is connected to, for example, the current addition circuit 30.

The current/voltage conversion circuits 41 and the current/voltage conversion circuit 42 are, for example, shunt resistors. Each of the shunt resistors is a resistor which is built into an electrical circuit for the purpose of detecting a current and linearly converts the current into a voltage. An example in which variable resistors having a control terminal are used as the current/voltage conversion circuits 41 and the current/voltage conversion circuit 42 is illustrated herein.

The division circuit 50 calculates a ratio of the voltage obtained by converting each of the currents and the voltage obtained by converting the sum of the currents. The voltage converted by the current/voltage conversion circuit 41 corresponds to the voltage obtained by converting each of the currents. The voltage converted by the current/voltage conversion circuit 42 corresponds to the voltage obtained by converting the sum of the currents.

The division circuit 50 in FIG. 3 normalizes each of the voltages converted by the current/voltage conversion circuits 41 using the voltage converted by the current/voltage conversion circuit 42. A voltage $V_{sum}$ convened by the current/voltage conversion circuit 42 is adjusted, for example, so that $V_{sum}$=R2/(R1+R2)×Vcc is satisfied. This adjustment is performed by changing a resistance value (impedance) of the variable resistors that are the current/voltage conversion circuits 41 and 42. The variable resistors each have the same resistance value (impedance). Vcc is a power supply voltage. A total value of the voltages converted by the current/voltage conversion circuits 41 becomes "1" by normalizing the voltage $V_{sum}$ to "1"

The analogue arithmetic unit 100 can directly output the division processing result obtained by dividing the voltage of each of the current/voltage conversion circuits 41 by the total voltage converted by the current/voltage conversion circuit 42 by normalizing each of the voltages converted by the current/voltage conversion circuits 41 using the total voltage. Furthermore, it is possible to reduce the influence of a change in temperature by normalizing the total voltage. As illustrated in Expression (3), the current/voltage characteristics of the diodes are affected by a temperature. The influence of the temperature on each of the diodes is reduced by normalizing each of the voltages using the total voltage.

The division circuit 50 is not limited to that illustrated in FIG. 3. For example, the division circuit 50 may be a circuit which includes a memory configured to store each of the voltages converted by the current/voltage conversion circuits 41 and the total voltage converted by the current/voltage conversion circuit 42 and an arithmetic unit configured to divide each of the voltages by the total voltage.

An operation of the analogue arithmetic unit 10 according to the first embodiment will be explained below.

First, input voltages $V1_{in}$, $V2_{in}$, $V3_{in}$, and $V4_{in}$ are applied to the input terminals 10, respectively. Each of the input voltages $V1_{in}$, $V2_{in}$, $V3_{in}$, and $V4_{in}$ corresponds to an input to the activation function F.

The voltage input from each of the input terminals 10 is amplified by each of the voltage amplifier circuits 11. Each of the input voltages $V1_{in}$, $V2_{in}$, $V3_{in}$, and $V4_{in}$ are doubled, for example, using each of the voltage amplifier circuits 11. An amplification factor of each the input voltages $V1_{in}$, $V2_{in}$, $V3_{in}$, and $V4_{in}$ is not limited to double and can be set in accordance with a division ratio between each of the voltage/current conversion circuits 20 and each of the current replication circuits 21. A case in which the amplification factor in each of the voltage amplifier circuits 11 is double will be explained below as an example.

Each of the voltages $2V1_{in}$, $2V2_{in}$, $2V3_{in}$, and $2V4_{in}$ amplified by the voltage amplifier circuits 11 is then applied to each of the voltage/current conversion circuits 20. The voltage/current conversion circuits 20 and the bipolar transistors of the current replication circuits 21 are connected in series. The bipolar transistors each have a base and a collector electrode which are short-circuited and exhibit the same voltage/current characteristics as the voltage/current conversion circuits 20. For this reason, a voltage based on the division ratio of the voltage/current conversion circuits 20 and the current replication circuits 21 is applied to the voltage/current conversion circuits 20 and the current replication circuits 21. For example, when the amplification factor of the voltage amplifier circuits 11 is double and the division ratio of the voltage/current conversion circuits 20 is 50%, voltages having the same magnitude as the input voltages $V1_{in}$, $V2_{in}$, $V3_{in}$, and $V4_{in}$ are applied to the voltage/current conversion circuits 20.

The voltage/current conversion circuits 20 exponentially convert the input voltages $V1_{in}$, $V2_{in}$, $V3_{in}$, and $V4_{in}$ and output the converted voltages as current $I_1$, $I_2$, $I_3$, and $I_4$. The input voltages $V1_{in}$, $V2_{in}$, $V3_{in}$, and $V4_{in}$ are difference between the input potentials and the ground potential.

For example, the voltage/current conversion circuits 20 exponentially convert the input voltages $V1_{in}$, $V2_{in}$, $V3_{in}$, and $V4_{in}$ and output the converted voltages as the currents $I_1$, $I_2$, $I_3$, and $I_4$ as expressed by expression (2). This exponential conversion corresponds to the processing of converting the input signal $x_i$ in the softmax function into $e^{xi}$.

Also, the current replication circuits 21 output currents $I_1$, $I_2$, $I_3$, and $I_4$ having the sane magnitude as the currents $I_1$, $I_2$, $I_3$, and $I_4$ output from the voltage/current conversion circuits 20 to the current/voltage conversion circuits 41.

Furthermore, the currents $I_1$, $I_2$, $I_3$, and $I_4$ having the same magnitude as the currents $I_1$, $I_2$, $I_3$, and $I_4$ output from the voltage/current conversion circuits 20 are applied to the current addition circuit 30. In the current addition circuit. 30, the currents $I_1$, $I_2$, $I_3$, and $I_4$ are combined to form a combined current $I_{sum}$.

The current/voltage conversion circuits 41 convert the currents $I_1$, $I_2$, $I_3$, and $I_4$ into voltages $V1_{out}$, $V2_{out}$, $V3_{out}$, and $V4_{out}$. In addition, the current/voltage conversion circuit 42 converts the combined current $I_{sum}$ into a voltage $V_{sum}$. Here, the voltage is generated between both terminals of each of the current/voltage conversion circuits. The voltage $V_{sum}$ satisfies, for example, $V_{sum}=R2/(R1+R2)\times Vcc$.

The division circuit 50 obtains a ratio of the voltage $V_{sum}$ to the voltages $V1_{out}$, $V2_{out}$, $V3_{out}$, and $V4_{out}$. The voltages $V1_{out}$, $V2_{out}$, $V3_{out}$, and $V4_{out}$ normalized using the voltage $V_{sum}$ are output from the analogue arithmetic unit. Each of the voltages $V1_{out}$, $V2_{out}$, $V3_{out}$, and $V4_{out}$ correspond to the output signal $y_i$ in the softmax function. The output signal is input to the comparator C in FIGS. 1 and 2.

The analogue arithmetic unit 100 according to the first embodiment can reduce an arithmetic operation load relating to the arithmetic operation processing. The analogue arithmetic unit 100 perform signal conversion by converting analogue physical quantities such as a current and a voltage. When the activation function F is performed using the digital arithmetic unit, the arithmetic operation processing in which an input signal is substituted into to an arithmetic operation is required. The analogue arithmetic unit 100 according to the first embodiment does not require this arithmetic operation and can reduce the arithmetic operation load of the arithmetic unit.

Moreover, the analogue arithmetic unit 1M according to the first embodiment can reduce the time required for the arithmetic operation processing.

Figure 5:
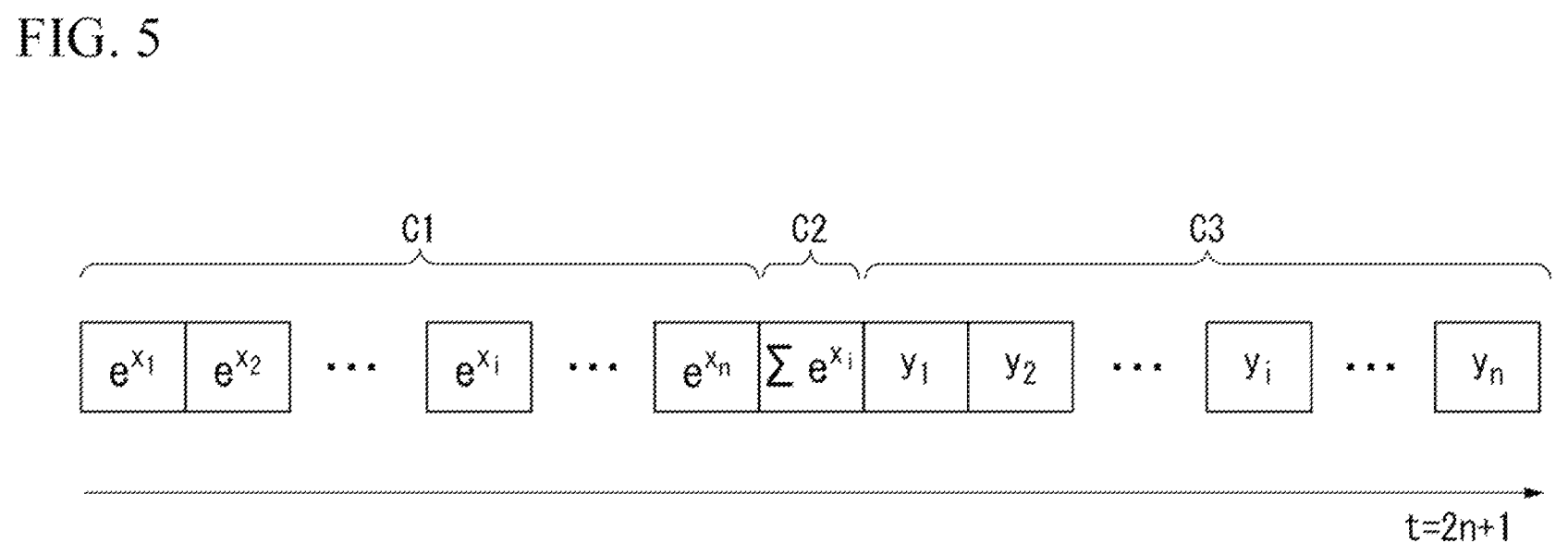

FIG. 5 is an image diagram of arithmetic operation processing when all of the arithmetic operations of the activation function F are performed using the digital arithmetic unit (software). The processing of the activation function F illustrated in FIG. 5 is the softmax function. The software executes a first arithmetic operation C1 which exponentially converts the input signal $x_i$, a second arithmetic operation C2 which obtains a sum of the exponentially converted signals $e^{xi}$, and a third arithmetic operation C3 which divides each of the exponentially convened signals $e^{xi}$ by the sum obtained through the second arithmetic operation. The first arithmetic operation C1 and the third arithmetic operation C3 both have n arithmetic operations. That is to say, the digital arithmetic unit needs to perform 2n+1 arithmetic operation processes in sequence.

On the other hand, the analogue arithmetic unit 100 performs the processing corresponding to the first arithmetic operation C1 using the voltage/current conversion circuits 20. Furthermore, the analogue arithmetic unit 100 performs the processing corresponding to the second arithmetic operation C2 using the current addition circuit 30. In addition, the analogue arithmetic unit 100 performs the processing corresponding to the third arithmetic operation C3 using the current/voltage conversion circuit 41, the current/voltage conversion circuit 42, and the division circuit 50. The analogue arithmetic unit 100 performs these processes in parallel.

In the case of the digital arithmetic unit, the third arithmetic operation cannot be performed until the first arithmetic operation C1 and the second arithmetic operation C2 have been performed and these arithmetic operations need to be performed in sequence. On the other hand, the analogue arithmetic unit 100 can perform these processes simultaneously in parallel by performing these processes through the replacement with conversions of the physical quantities. That is to say, the analogue arithmetic unit 100 can reduce the time relating to the arithmetic operation. Furthermore, the analogue arithmetic unit 100 can has a small arithmetic operation load and be driven with low power consumption by incorporating each arithmetic operation step and sequence into the circuit.

Second Embodiment

Figure 6:
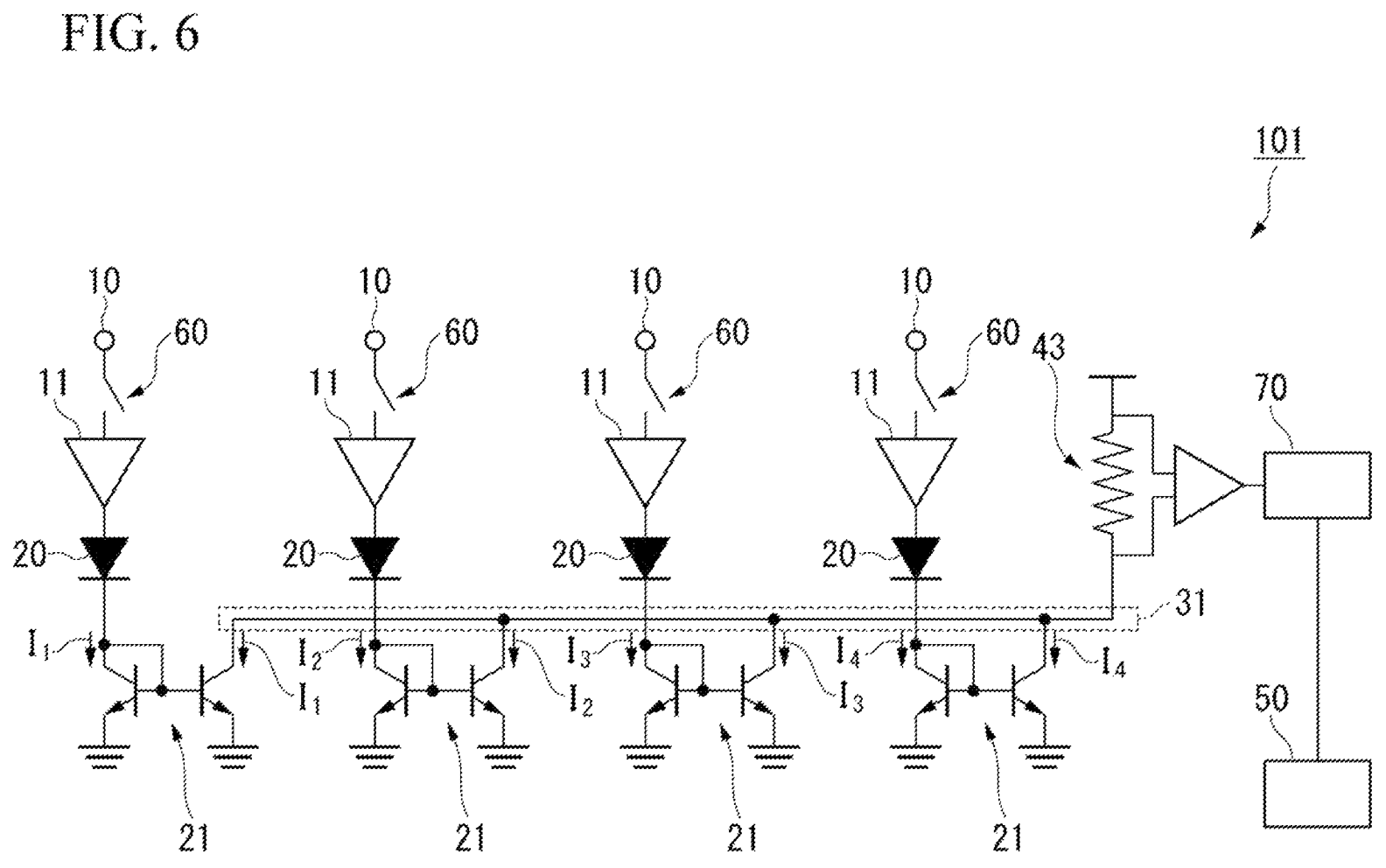

FIG. 6 is a pattern diagram of an analogue arithmetic unit 101 according to a second embodiment. The analogue arithmetic unit 101 realizes the processing of the activation function using a circuit having a physical device used therein. The analogue arithmetic unit 101, for example, simulates the processing of the softmax function of the activation function.

The analogue arithmetic unit 101 includes a plurality of input terminals 10, voltage/current conversion circuits 20, a current addition circuit 31, a current/voltage conversion circuit 43, a division circuit 50, switches 60, and an analogue-to-digital converter 70. Constituent elements in the analogue arithmetic unit 101 that are the same as those of the analogue arithmetic unit 100 will be denoted by the same reference symbols and description thereof will be omitted.

The current addition circuit 31 obtains a sum of the currents converted by the voltage/current conversion circuits 20. The current addition circuit 31 is connected to, for example, each of the current replication circuits 21. The current output from each of the current replication circuits 21 is combined using the current addition circuit 31.

The current/voltage conversion circuit 43 is connected to the current addition circuit 31. The current/voltage conversion circuit 43 converts each of the currents converted by the voltage/current conversion circuits 20 into a voltage. Furthermore, the current/voltage conversion circuit 43 converts a sum of the currents converted by the voltage/current conversion circuits 20 into a voltage. The current applied to the current/voltage conversion circuit 43 is changed by switching turning on/off of the switches 60 The current/voltage conversion circuit 43 is, for example, a shunt resistor.

Known switches can be used for the switches 60. Each of the switches 60 is, for example, a transistor, an element in which a phase change in crystal layer is used such as an Ovonic threshold switch (OTS), an element in which a change in band structure is used such as a metal/insulator transition (MIT) switch, an element in which a breakdown voltage is used such as a Zener diode and an avalanche diode, and an element in which conductivity changes as an atom position changes.

Each of the switches 60 is, for example, located between each of the input terminals 10 and each of the voltage/current conversion circuits 20. The switches 60 may be installed between of the current replication circuits 21 and the current addition circuit 31.

The analogue-to-digital converter 70 converts an analogue voltage value output from the current/voltage conversion circuit 43 into a digital voltage value. The analogue-to-digital converter 70 may be omitted.

The division circuit 50 calculates a ratio of a voltage obtained by convering each of the currents to a voltage obtained by converting the sum of the currents. The division circuit 50 includes, for example, a memory and an arithmetic unit. The memory stores, for example, each of the voltages convened by the current/voltage conversion circuit 43. The arithmetic unit divides the voltage obtained by converting each of the currents by the voltage obtained by converting the sum of the currents, An operation of the analogue arithmetic unit 101 according to the second embodiment will be explained below.

First, all of the switches 60 are turned on. Furthermore, input voltages $V1_{in}$, $V2_{in}$, $V3_{in}$, and $V4_{in}$ are applied to each of the input terminals 10. The voltage current conversion circuits 20 exponentially convert the input voltages $V1_{out}$, $V2_{out}$, $V3_{out}$, and $V4_{out}$ and output the converted voltages as currents $I_1$, $I_2$, $I_3$, and $I_4$. This processing is the same as that of the analogue arithmetic unit 100 according to the first embodiment.

Subsequently, currents $I_1$, $I_2$, $I_3$, and $I_4$ having the same magnitude as the currents $I_1$, $I_2$, $I_3$, and $I_4$ output from the voltage/current conversion circuits 20 are applied to the current addition circuit 31. In the current addition circuit 31, the currents $I_1$, $I_2$, $I_3$, and $I_4$ are combined to form a combined current $I_{sum}$.

The current/voltage conversion circuit 43 converts the combined current $I_{sum}$ into the voltage $V_{sum}$. The $V_{sum}$ is a voltage generated between both terminals of the current/voltage conversion circuit 43. The $V_{sum}$ is converted into a digital value using the analogue-to-digital converter 70 and stored in the division circuit 50. The voltage $V_{sum}$ corresponds to a sum of $e^{xi}$ (i=1, 2, . . . , n) obtained in the softmax function. That is to say, the voltage $V_{sum}$ stored in the division circuit 50 corresponds to the denominator of the softmax function.

Subsequently, any one of the switches 60 is turned on and the other switches are turned off. In this case, only a current (for example, current $I_1$) converted by the voltage/current conversion circuit 20 in which the switch 60 is turned on is applied to the current addition circuit 31 and the current/voltage conversion circuit 43. The current/voltage conversion circuit 43 converts the applied current $I_1$ into a voltage $V_1$. The voltage $V_1$ is a voltage generated between both terminals of the current/voltage conversion circuit 43. The $V_1$ is converted into a digital value using the analogue-to-digital converter 70 and stored in the division circuit 50.

Also, the switch 60 to be turned on is switched. A voltage $V_i$ in each case of i=1, 2, . . . , n is obtained by switching the switch 60 to be turned on. Hach of the voltages $V_i$ (i=1, 2, . . . , n) is stored in the division circuit 50. The voltages $V_1$ obtained herein corresponds to the numerator of the softmax function. The voltages $V_i$ are each voltages generated between both terminals of the current/voltage conversion circuit 43.

The division circuit 50 divides the voltages $V_i$ (i=1, 2 . . . , n) by a voltage $V_{sum}$. The division results correspond to an output signal $y_i$ in the softmax function. The output signals are input to the comparator C in FIGS. 1 and 2.

The analogue arithmetic unit 101 according to the second embodiment has the same effects as the analogue arithmetic unit 100 according to the first embodiment.

Also, the analogue arithmetic unit 101 according to the second embodiment can reduce the time required for arithmetic operation processing.

Figure 7:
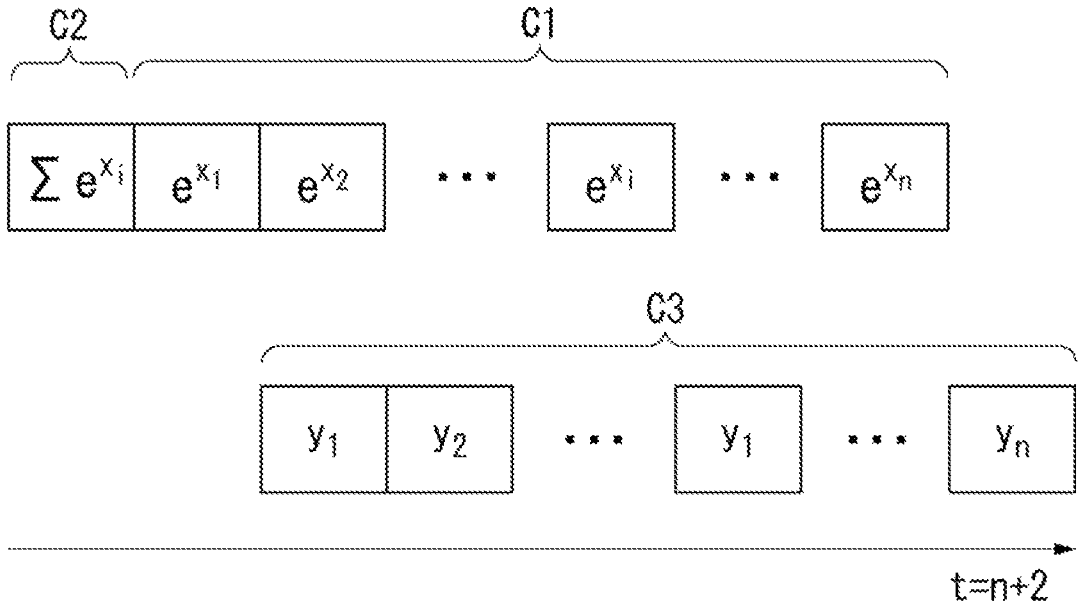
FIG. 7 is an image diagram of arithmetic operation processing when an arithmetic operation of a softmax function is performed using the analogue arithmetic unit.

FIG. 7 is an image diagram of the processing of the analogue arithmetic unit 101. The analogue arithmetic unit 101 performs processing corresponding to the first arithmetic operation C1 and the second arithmetic operation C2 using the voltage/current conversion circuits 20, the current addition circuit 31, and the current/voltage conversion circuit 43. The first arithmetic operation C1 and the second arithmetic operation C2 are switched by switching turning on/off of the switches 60. The analogue arithmetic unit 101 performs the third arithmetic operation C3 using the division circuit 50. The third arithmetic operation C3 can be performed after the second arithmetic operation C2 and at least one of the first arithmetic operation C1. For this reason, the analogue arithmetic unit 101 can perform the first arithmetic operation C1 and the third arithmetic operation C3 in parallel and can reduce the time required for arithmetic operations as compared with the arithmetic operations performed using the device arithmetic unit (software).

Also, the analogue arithmetic unit 101 according to the second embodiment can switch the currents input to the current/voltage conversion circuit 43 in a time division manner using the switches 60 to perform the entire first arithmetic operation and the second arithmetic operation. For this reason, one current/voltage conversion circuit 43 is sufficient for the analogue arithmetic unit 101. As a result, the analogue arithmetic unit 101 according to the second embodiment can reduce an element area.

Figure 8:
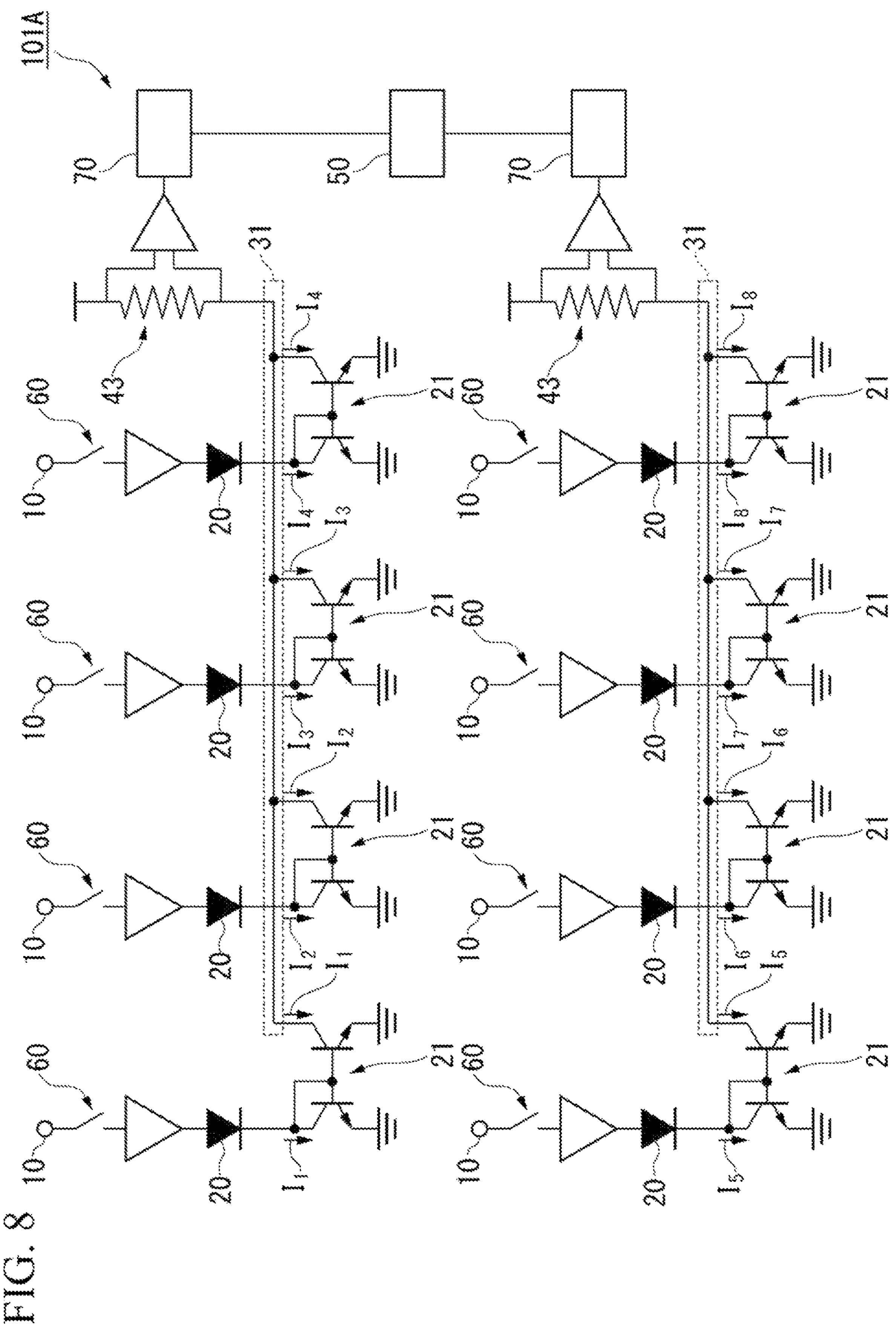
FIG. 8 is a pattern diagram of another example of the analogue arithmetic unit according to the second embodiment.

Also, FIG. 8 is a pattern diagram of an analogue arithmetic unit 101A according to a first modified example. The analogue arithmetic unit 101A has a plurality of units including a plurality of input terminals 10, voltage/current conversion circuits 20, a current addition circuit 31, a current/voltage conversion circuit 43, switches 60, and an analogue-to-digital converter 70. The number of units is not limited to two and may be three or more.

The analogue arithmetic unit 101A according to the first modified example can perform processes of a first arithmetic operation C1 in parallel using the plurality of units. Therefore, the analogue arithmetic unit 10I A according to the first modified example can reduce the time required for arithmetic operations.

Third Embodiment

Figure 9:
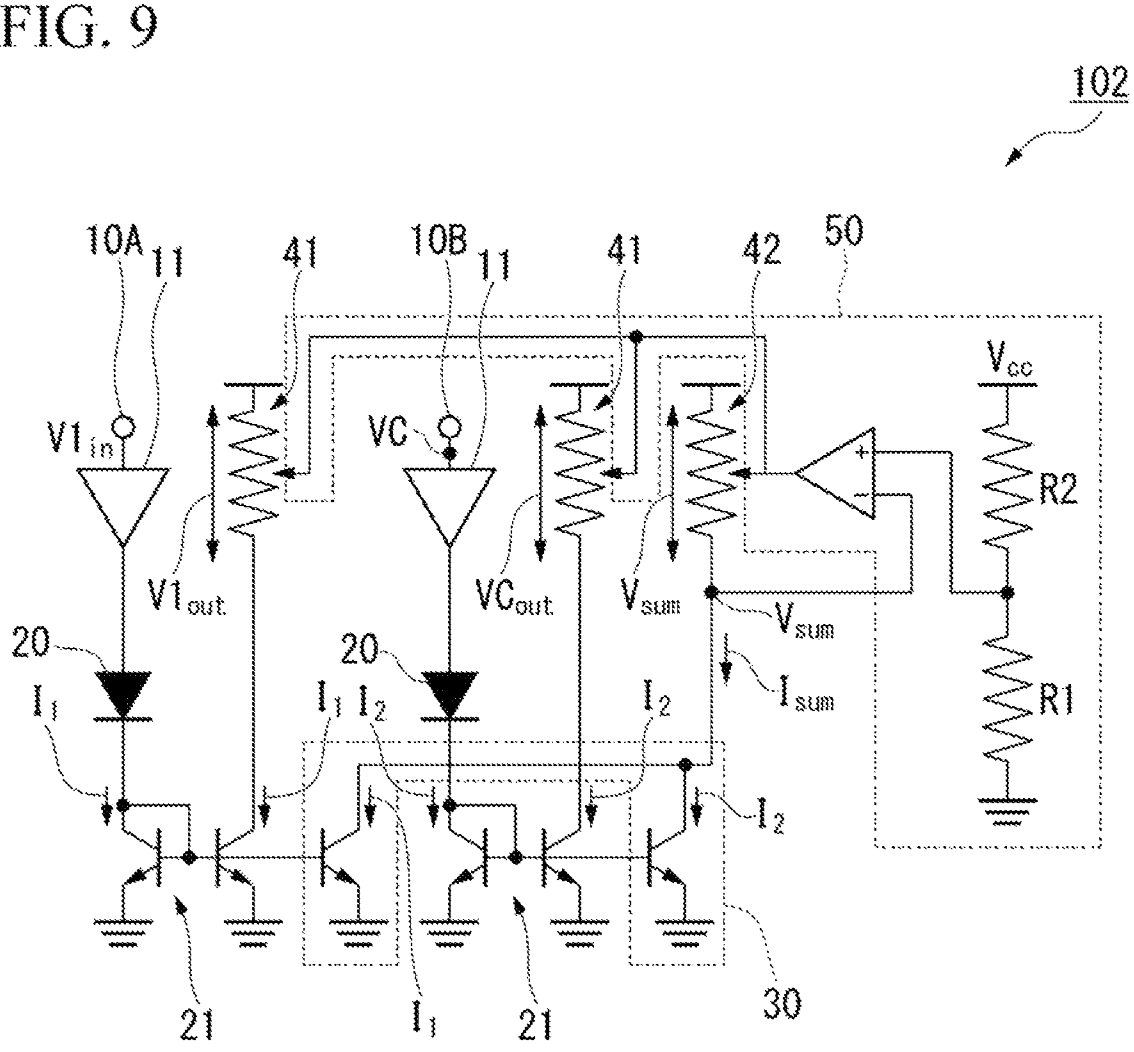
FIG. 9 is a pattern diagram of an analogue arithmetic unit according to a third embodiment.

FIG. 9 is a pattern diagram of an analogue arithmetic unit 102 according to a third embodiment. The analogue arithmetic unit 102 is obtained by realizing the processing of the activation function by a circuit in which a physical device is used. The analogue arithmetic unit 102, for example, simulates the processing of the sigmoid function of the activation function.

The analogue arithmetic unit 102 includes a first input terminal 10A, a second input terminal 108, voltage/current conversion circuits 20, a current addition circuit 30, current/voltage conversion circuits 41 and 42, and a division circuit 50. Constituent elements in the analogue arithmetic unit 102 that are the same as those of the analogue arithmetic unit 100 will be denoted by the same reference symbols and description thereof will be omitted.

An operation of the analogue arithmetic unit 102 according to the third embodiment will be explained below.

An input voltage $V1_{in}$ is applied to the first input terminal 10A and a reference voltage VC is applied to the second input terminal 10B. The reference voltage VC is a voltage at which a current flowing through an exponential conversion element is negligible, and for example, a built-in potential of a diode.

The input voltage $V1_{in}$ is converted using a voltage amplifier circuit 11, the voltage/current conversion circuits 20, and the current/voltage conversion circuits 41 and becomes a voltage $V1_{out}$. The voltage $V1_{out}$ corresponds to exp(x) of the sigmoid function. Furthermore, the reference voltage VC is converted using the voltage amplifier circuit 11, the voltage/current conversion circuits 20, and the current/voltage conversion circuits 41 and becomes a voltage $VC_{out}$. The $VC_{out}$ corresponds to exp(0) of the sigmoid function.

That is to say, the arithmetic operation of the sigmoid function expressed in Expression (3) can be replaced with the processing in the physical device using the voltage $V1_{out}$ and the voltage $VC_{out}$.

The analogue arithmetic unit 102 according to the third embodiment can reduce the arithmetic operation load of the arithmetic operation processing. The analogue arithmetic unit 102 performs signal conversion by convening analogue physical quantities such as a current and a voltage without performing the arithmetic operation of the digital arithmetic unit. When the activation function F is executed using the digital arithmetic unit, the arithmetic operation processing in which the input signal is substituted into the activation function needs to be performed in order of each arithmetic operation step and sequence. In the analogue arithmetic unit 102 according to the third embodiment, the arithmetic operation is incorporated into the analogue signal conversion in the circuit and the arithmetic operation load of the analogue arithmetic unit can be reduced.

Although the analogue arithmetic unit has been described in detail above using several embodiments as examples, the constitution of the analogue arithmetic unit is not limited to these embodiments and various modifications and changes are possible. For example, the characteristic constitutions according to the first embodiment to the third embodiment may be applied to other embodiments.

EXPLANATION OF REFERENCES

N1, N2 Neural network
$L_{in}$ Input layer
R Reservoir layer
$L_{in}$ Intermediate layer
$L_{out}$ Output layer
F Activation function
C Comparator
n Node
10 Input terminal
11 Voltage amplifier circuit
20 Voltage/current conversion circuit
21 Current replication circuit
30 Current addition circuit
41, 42, 43 Current/voltage conversion circuit
50 Division circuit
60 Switch
70 Analogue-to-digital converter

What is claimed is:

1. An analogue arithmetic unit, comprising:

a plurality of input terminals;

a voltage to current conversion circuit which exponentially converts each input voltage applied to each of the plurality of input terminals and outputs the converted input voltage as a current;

a current addition circuit which obtains a sum of the currents converted by the voltage to current conversion circuit;

a current to voltage conversion circuit which converts each of the currents and the sum of the currents into voltages; and a division circuit which calculates ratio outputs, each ratio output being between a voltage obtained by converting a respective one of the currents and a total voltage obtained by converting the sum of the currents, wherein the division circuit normalizes the ratio outputs using the total voltage and calculates a sum of the ratio outputs to be 1.

2. The analogue arithmetic unit according to claim 1, wherein the voltage to current conversion circuit comprises a plurality of diodes, each of the plurality of diodes being connected to a respective one of the plurality of input terminals and outputting a current by exponentially converting the input voltage applied to the respective input terminal.

3. The analogue arithmetic unit according to claim 1, further comprising:

a switch which controls one or more of the currents flowing through the current to voltage conversion circuit.

4. The analogue arithmetic unit according to claim 1, wherein the plurality of input terminals comprises, for each input channel, a first input terminal configured to receive the input voltage and a second input terminal configured to receive a reference voltage, and the reference voltage of the voltage to current conversion circuit is applied to the second input terminal of each input channel.

5. A neuromorphic device, comprising:

the analogue arithmetic unit according to claim 1.

6. The analogue arithmetic unit according to claim 1, further comprising a current replication circuit configured to replicate each current output from the voltage-to-current conversion circuit, wherein the current addition circuit obtains a sum of the replicated currents, the replicated currents being equal in magnitude to the currents converted by the voltage to current conversion circuit.

7. The analogue arithmetic unit according to claim 1, wherein the current-to-voltage conversion circuit comprises one or more shunt resistors configured to linearly convert the currents and the sum of the currents into the voltages.

8. The analogue arithmetic unit according to claim 1, wherein normalizing the ratio outputs using the total voltage reduces temperature-induced variation in the currents converted by the voltage to current conversion circuit.

9. The analogue arithmetic unit according to claim 1, further comprising a plurality of switches configured to selectively supply, in a time-division manner, (i) the sum of the currents and (ii) each of the currents to the current-to-voltage conversion circuit, wherein the division circuit includes a memory and an arithmetic unit, the memory storing the total voltage obtained from the sum of the currents and voltages obtained from the respective currents, and the arithmetic unit calculating the ratio outputs based on the stored voltages.

* * * * *